United States Patent [19]

Nakai et al.

[11] Patent Number: 4,691,447

[45] Date of Patent: Sep. 8, 1987

[54] COFFEE ROASTER

[75] Inventors: Masayuki Nakai, Isesaki; Kikuo Ishikawa, Ashikaga; Shiro Okada, Isesaki, all of Japan

[73] Assignee: Sanden Corporation, Gunma, Japan

[21] Appl. No.: 760,836

[22] Filed: Jul. 31, 1985

[30] Foreign Application Priority Data

Jul. 31, 1984 [JP] Japan .......................... 59-117949[U]
Jul. 31, 1984 [JP] Japan .......................... 59-117950[U]

[51] Int. Cl.⁴ .......................................... F26B 11/08
[52] U.S. Cl. ............................................ 34/4; 34/39; 34/68
[58] Field of Search ................ 34/225, 233, 133, 4, 34/68, 39; 99/286, 281, 287, 288, 468, 470, 474, 479

[56] References Cited

U.S. PATENT DOCUMENTS

| | | |
|---|---|---|
| 1,970,499 | 8/1934 | Dent .......................................... 34/48 |
| 1,985,604 | 12/1934 | Fitzgerald . |
| 2,109,597 | 3/1938 | Richeson . |
| 2,141,586 | 12/1938 | Woolsey et al. . |
| 2,700,225 | 1/1955 | Schmid et al. . |
| 4,271,603 | 6/1981 | Moore ..................................... 34/233 |
| 4,325,191 | 4/1982 | Kumagai et al. ....................... 34/54 |
| 4,493,156 | 1/1985 | Siegmann ................................ 34/56 |

*Primary Examiner*—Larry I. Schwartz
*Attorney, Agent, or Firm*—Banner, Birch, McKie and Beckett

[57] ABSTRACT

A coffee roasting apparatus is disclosed. The apparatus includes a coffee roasting drum which is operatively connected to a driving mechanism to cause the drum to rotate. The drum comprises a cylindrical element having an upper opening, a bottom opening and a bottom plate placed below the bottom opening to control the opening and closing of the bottom opening. An infrared heater is placed above the upper opening of the drum and an electrical heating element is placed below the drum at a position slightly above the lowermost portion of the drum. Coffee beans which are roasted by the radiation hearing of the infrared heater and the air which passes through the electrical heat element are discharged into a box through a gap defined between the bottom opening of the cylindrical element and the bottom plate.

8 Claims, 4 Drawing Figures

COFFEE ROASTER

FIELD OF THE INVENTION

This invention relates to a coffee roaster and, more particularly, to an improved roasting drum for a coffee roaster and a roasting device.

BACKGROUND OF THE INVENTION

Presently, there are two methods of roasting coffee, a hot blast method and a heat radiation method. The hot blast method is easily utilized in a coffee roaster, as shown in U.S. Pat. Nos. 4,325,191 and 4,271,603. However, the hot blast method produces coffee which is sour and does not smell, or taste, like real coffee. On the other hand, the heat radiation method maintains the smell and flavor of coffee. Yet the construction of the roaster for the heat radiation method is complicated and it takes a long time to roast the coffee.

A roasting drum is normally cylindrically shaped and comprises a cylindrical drum element and a bottom plate. Either the drum element or the bottom plate is operatively connected to a driving source to provide a rotating motion, and the remaining part is fixed on the apparatus. Because one element is fixed and the other is rotating, a gap exists between the two elements. If the gap between the drum element and the bottom plate becomes too large, the coffee beans may fall into the gap and finally interfere with the rotating motion. Also, if the gap between the drum element and the bottom plate is too small, the friction between the drum element and the bottom plate will interfere with the smooth rotational motion.

SUMMARY OF THE INVENTION

It is an object of this invention to provide an improved coffee roaster utilizing the heat radiation method, in which the coffee is uniformly roasted while the roasting time is reduced.

It is another object of this invention to provide a coffee roaster utilizing the heat radiation roasting method, in which the flavor of the roasted coffee is improved.

It is still another object of this invention to provide a coffee roaster utilizing the heat radiation roasting method, in which the roasted coffee is easily discharged from the roaster.

It is further an object of this invention to provide a coffee roaster which accomplishes the above objects with simple construction and low cost.

A coffee roasting apparatus in accordance with the present invention includes a rotatable drum which is provided with a plurality of holes. A coffee beans supply duct is arranged at an upper portion of the apparatus above the drum. A driving means is operatively connected with the drum to cause the rotating motion of the drum. The drum comprises an annular ring element having an upper opening and a bottom plate slidably attached to the driving means to control the opening and closing of the bottom opening. Alternatively, the drum may be fixed and the bottom plate may be rotatable. A plurality of stirring blades are formed on an inner surface of the ring element for facilitating the stirring of the coffee beans.

In a preferred embodiment of this invention, an infrared heat element is placed close to the upper opening of the drum to provide the radiation heating to roast the coffee beans. A second heat element is also disposed in an air supply duct which is located below the drum, the heat element located slightly above the lowermost portion of the drum for injecting heated air into the drum. In this way, the coffee beans are uniformly roasted within a short time by the heating element and the infrared heater.

Further objects, features and other aspects of this invention will be understood from the detailed description of the preferred embodiment of this invention and with reference to the attached drawings which form a further part of the disclosure.

DETAILED DESCRIPTION

Figure 1:
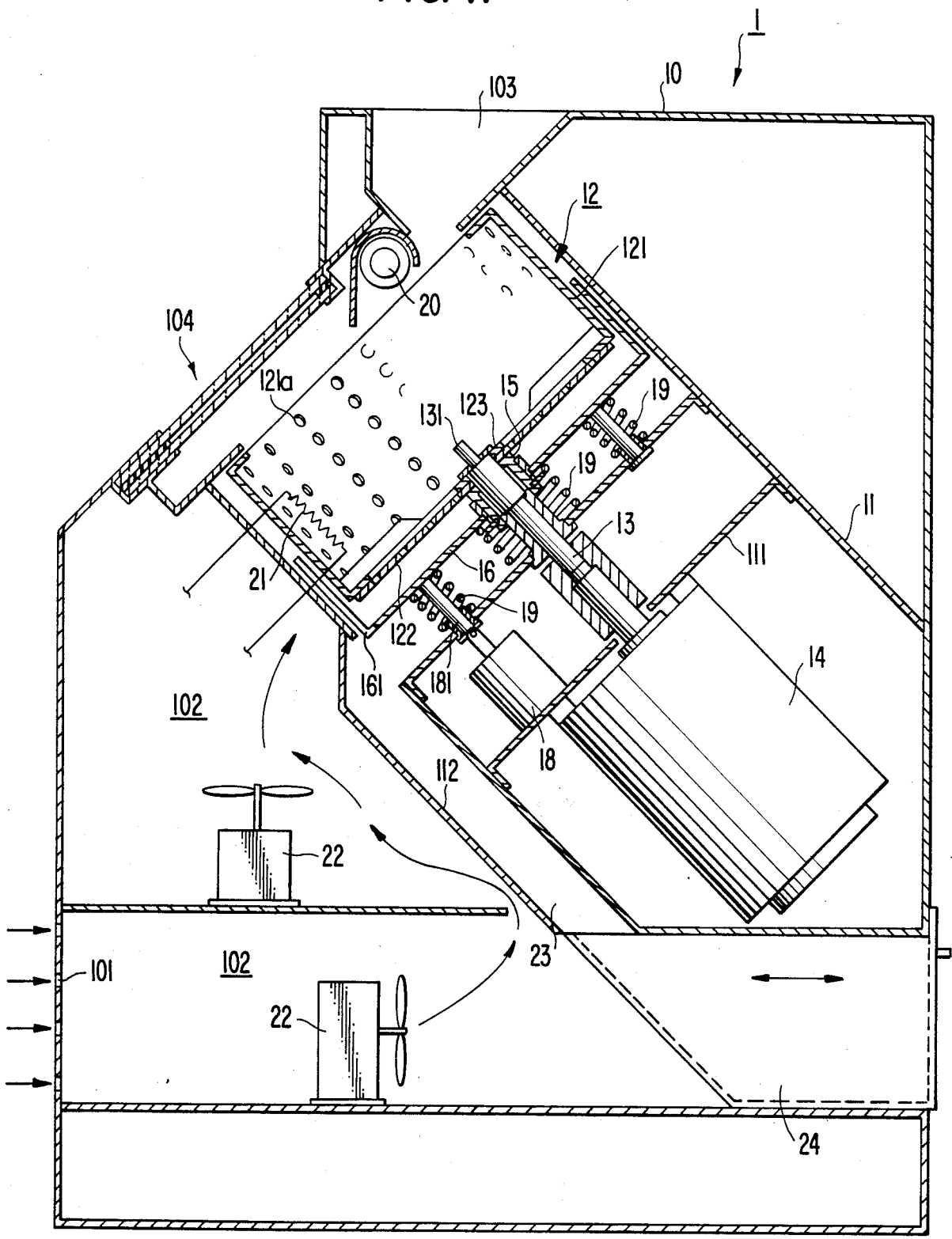
FIG. 1 is a vertically cross-sectional view of a coffee roaster according to one preferred embodiment of this invention.

Referring to FIG. 1, a coffee roasting apparatus according to the present invention is shown. The coffee roasting apparatus 1 has an outer housing 10 in which the elements of the roaster are disposed.

Figure 2:
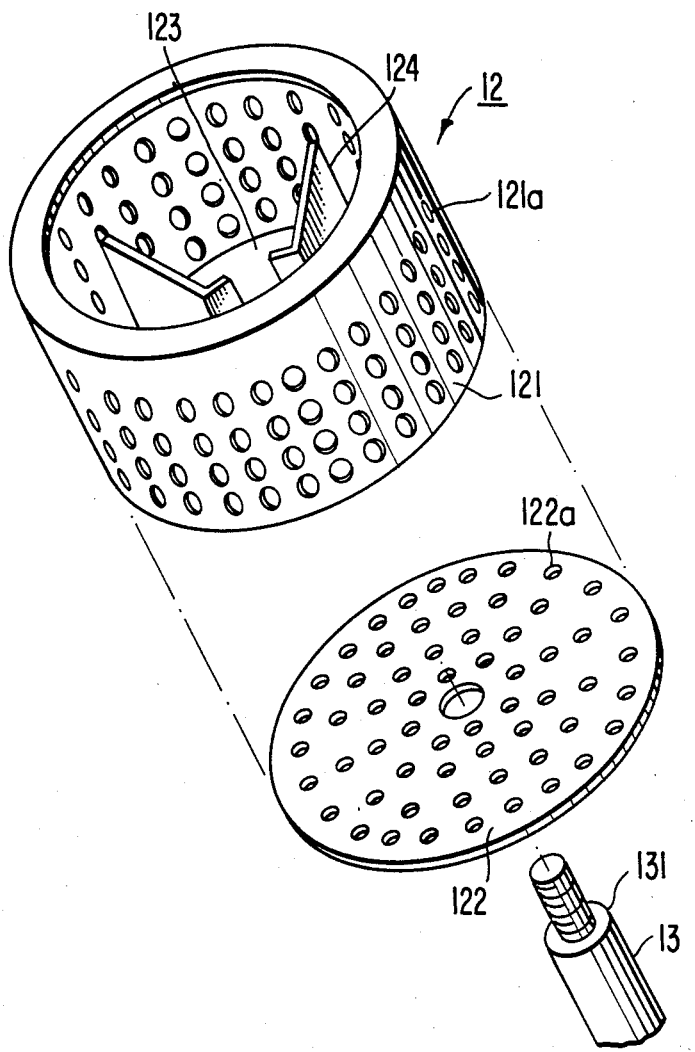
FIG. 2 is an exploded perspective view of a roaster drum used in the coffee roaster of FIG. 1.
Figure 3:
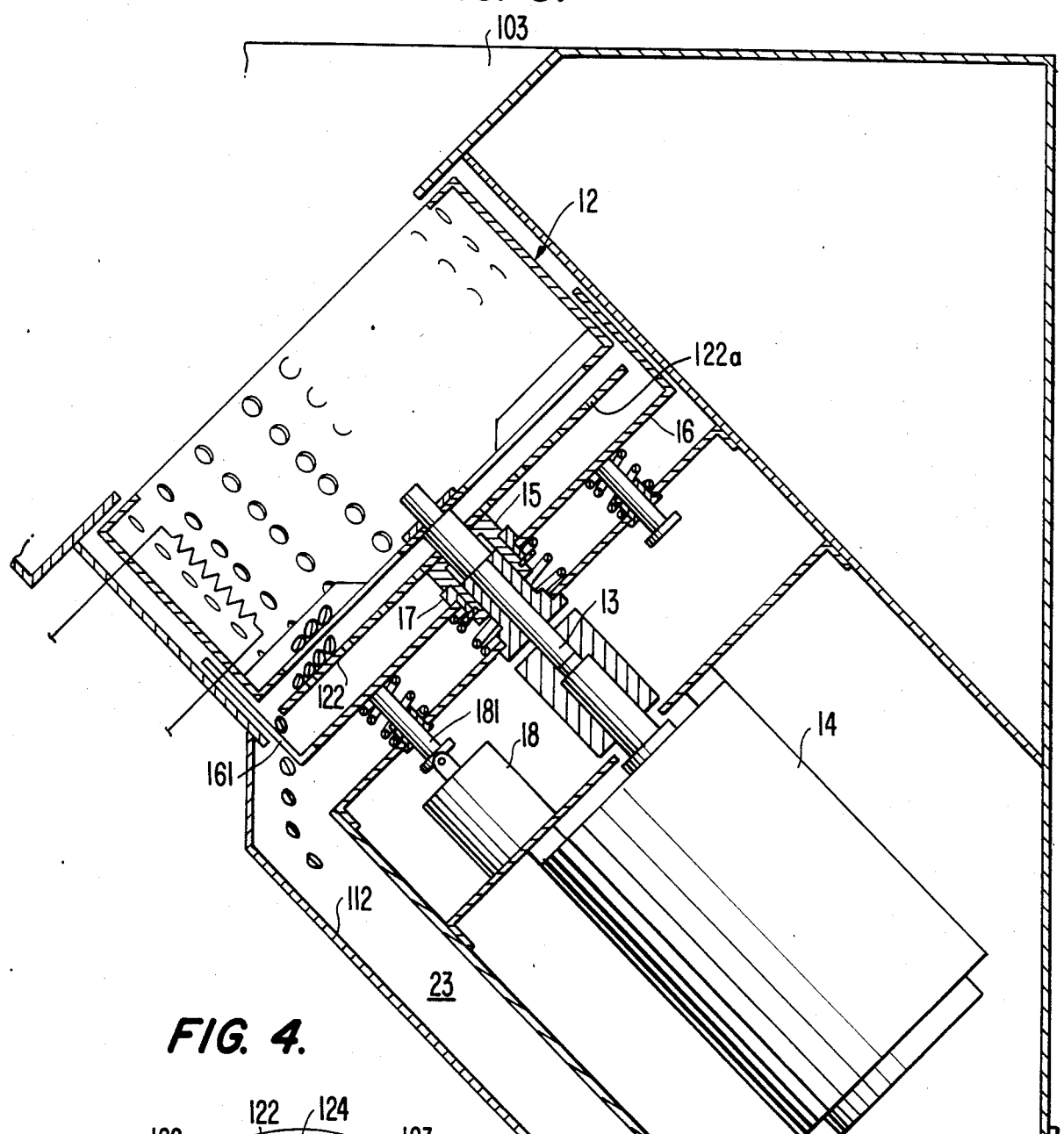
FIG. 3 is an enlarged cross-sectional view of a coffee roaster illustrating the discharging operation of roasted coffee.

An annular shaped support member 11 is disposed within the interior of housing 10, the axis of the supporting member being tilted with respect to the vertical axis of housing 10. A roaster drum 12 is disposed in an upper opening portion of support member 11 so as to be coaxially aligned with support member 11. Roaster drum 12 is rotatably driven through drive shaft 13 by motor 14 which is fixed on supporting member 11 through support plate 111. Drum 12 is cylindrically shaped and, as shown in FIG. 2, comprises an annular ring element 121 having an upper opening and a bottom opening, and a bottom plate 122 which is disposed on the the bottom face of a ring element 121 to cover the bottom opening. Ring element 121 has a plurality of holes 121a disposed around its periphery and is provided with support frame 123 at its bottom opening portion. Support frame 123 is fixed to one end portion 131 of drive shaft 13. Bottom plate 122 is also provided with a plurality of holes 122a and is slidably attached to end portion 131 of drive shaft 13 through a bearing 15. Therefore, annular ring element 121 and bottom plate 122 are rotated together by motor 14. The opening and closing of the bottom opening are controlled by reciprocal movement of bottom plate 122. At least three blade elements 124 are formed on an inner surface of ring element 121 for stirring the coffee beans. Holes 121a and 122a formed through ring element 121 and bottom plate 122 have dimensions such that the coffee beans cannot fall down therethrough while enabling the circulation of heated air therethrough to absorb the moisture given off by the heated coffee beans.

A cover frame 16, with a U-shaped cross-section, is slidably fitted on drive shaft 13 through a connecting element 17 disposed on bearing 15 in its stationary position. The slidable movement of cover frame 16 is synchronized, or moves together, with the movement of bottom plate 121 by a plunger 181 of a solenoid mechanism 18. Solenoid mechanism 18 is fixed on a support plate 111, and plunger 181 is attached to the bottom surface of cover frame 16 for enabling the reciprocal movement of cover frame 16. Cover frame 16 and bottom plate 122 are connected to one another through bearing 15. A spring element 19 is disposed around plunger 181 and drive shaft 13 for biasing cover frame 16 toward drum 12. As a result of this biasing operation, bottom plate 122 is normally closely fitted against the end surface of ring element 121. An outer peripheral portion of cover frame 16, which is located on the lower portion thereof, has a cut out portion 161 which forms a discharge path for the roasted coffee beans when cover frame 16 is drawn downwardly. This cut out portion 161 opens onto one end opening of a coffee beans exit chute 23 which is defined between the outer surface of annular support member 11 and a cover plate 112 attached to the outer surface of support member 11. The other end of exit chute opens onto a space in which a coffee beans receiving box 24 is normally located. Thus, the roasted coffee beans are discharged into receiving box 24 through exit chute 23.

Figure 4:
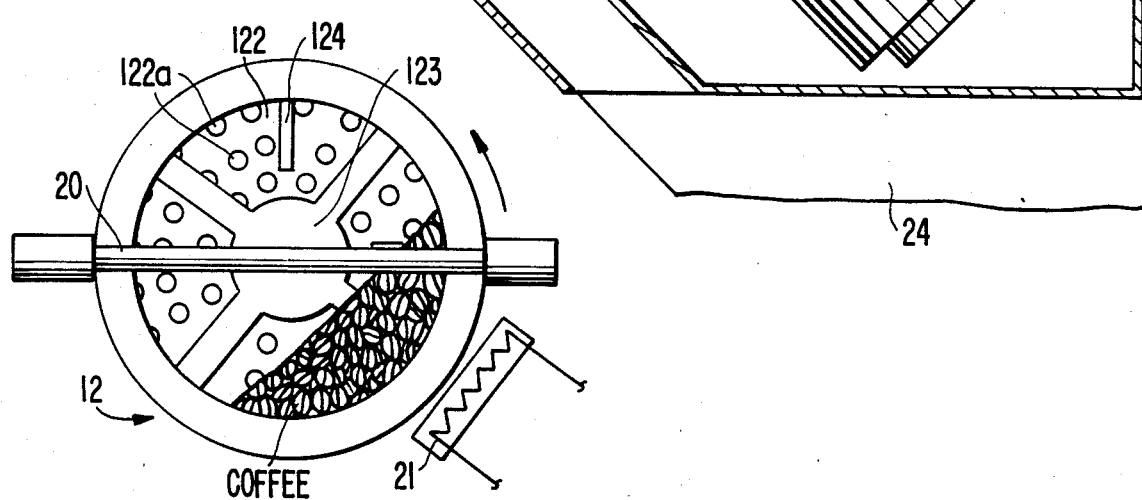
FIG. 4 is a front view of a roaster drum illustrating the movement of roasting coffee.

An infrared heater 20 is placed close to the upper opening of drum 12 for roasting the coffee beans disposed in drum 12 by radiation heating thereof. Furthermore, as best seen in FIG. 4, a heating element, for example, a nichrome wire heater 21, is disposed adjacent the outer peripheral portion of drum 12 radially offset in the direction of rotation from, or slightly above, the lowermost portion of drum 12. The heating element is located in this manner because the coffee beans in drum 12 are normally pulled toward this portion of drum 12 by rotation of drum 12 as shown in FIG. 4.

Outer housing 10 is provided with air inlet slits 101 into an air passageway 102 to introduce air into outer peripheral portion of drum 12 from the outside thereof. Heating element 21 is placed in the air passageway 102. At least one blower fan 22 is also placed in air passageway 102 to cause the air to circulate. The blower fan 22 forces heated air into drum 12 through the holes 121a. Outer housing 10 is also provided with coffee beans supply duct 103 which opens onto the upper opening of drum 12 and with window portion 104 which allows an observer to view the roasting coffee and check its condition.

In the operation of this apparatus, the coffee beans are introduced into drum 12 from supply duct 103 and then drum 12 is rotated by motor 14 to carry out the stirring operation. At that time, blower fan 22 is driven to force the heated air into drum 12 and infrared heater 20 and nichrome heater 21 are energized. The coffee beans contained within drum 12 are roasted evenly by the radiation heating from infrared heater 20 and the heated air passed through nichrome heater 21 due to the stirring motion of blade element 124 of drum 12. The degree to which the beans are roasted and the darkness of the beans are determined by the amount of time which the beans spend in the apparatus, which may be timed automatically. Alternatively or additionally, the condition of the beans may be monitored by observation through window 104 of the apparatus.

When the roasting operation is finished, the rotating movement of drum 12 is stopped and the energization of blower fan 22, infrared heater 20, and heating element 21 is ceased. Solenoid mechanism 18 is then energized to draw cover frame 16 and bottom plate 122 downwardly. As a result of the operation of solenoid mechanism 18, the coffee beans which are already roasted are discharged through the gap between the bottom opening of ring element 121 and bottom plate 122, cut out portion 161 of cover frame 16 and exit chute 23 into receiving box 24. After all the coffee beans are discharged, the energization of solenoid mechanism 18 is ceased, thus bottom plate 122 and cover frame 16 return to the previous position due to the recoil strength of spring 19.

As mentioned above, the roasting drum which is rotatably connected to the driving means comprises an annular ring element having an upper opening and a bottom opening and a bottom plate which is slidably attached on the driving means. Therefore, the roasted coffee beans are smoothly discharged through the gap between the bottom opening of ring element and bottom plate. Also, the stirring operation of the coffee beans by means of the stirring blades facilitates a uniformly roasted condition.

Furthermore, the coffee beans are roasted by the infrared heater which radiates at the approximate wave length to promote efficient heat absorption by coffee beans. Therefore, the coffee beans are uniformly heated and roasted. While it takes a relatively long time for the infrared element to reach the proper operating temperature, the total roasting time is not increased, since the heating element takes over for the infrared heater until the infrared heater is at the proper temperature.

This invention has been described in connection with the preferred embodiment, but this embodiment is merely illustrative only, and the invention should not be construed as limited thereto, particularly in matters of size, shape and arrangement of parts. It should be apparent to those skilled in the art that other variations or modifications can be made within the scope of this invention, as interpreted by the broad general meaning of the terms in which the following claims are expressed.

We claim:

1. In a coffee roasting apparatus including a rotatable drum at an acute angle to the horizontal provided with a plurality of holes for promoting the roasting of coffee beans, a coffee bean supply duct arranged at an upper portion of the apparatus above said drum and a drive means operatively connected to said drum to cause the rotating motion of said drum, the improvement comprising:

said drum comprising an annular ring element having an upper opening and a bottom opening, and a bottom plate adjacent said bottom opening and axially slidably attached on said drive means for controlling the opening and closing of said bottom opening of said ring element to provide a discharge path for the roasted coffee beans;
a plurality of stirring blades formed on an inner surface of said ring element; and
an infrared heater placed adjacent to said upper opening of said ring element for roasting the coffee beans by the infrared radiation heat.

2. The coffee roasting apparatus of claim 1 including solenoid mechanism for controlling sliding motion of said bottom plate.

3. The coffee roasting apparatus of claim 2 further including an exit chute opening immediately to a gap defined between the bottom opening of said ring element and said bottom plate when said bottom plate is drawn axially downwardly.

4. The coffee roasting apparatus of claim 1 further including an air supply duct in which at least one fan is disposed, said air supply duct being located near the lower portion of said drum; and a heating element disposed in said duct for heating the air to roast the coffee beans.

5. The coffee roasting apparatus of claim 4 wherein said heating element is disposed adjacent said drum and slightly above the lowermost position of said drum.

6. In a coffee roasting apparatus including a rotatable drum provided with a plurality of holes, a coffee beans supply duct arranged at an upper portion of the apparatus above said drum, a drive means operatively connected to said drum to cause rotating motion of said drum, an air supply duct arranged at a lower portion of said drum, and a heat element disposed within said air supply duct for heating the air forced by a fan, the improvement comprising:

said drum comprising an annular ring element having an upper opening and a bottom opening, said ring element being fixed on said drive means;

a bottom plate slidably fixed on said drive means for slidable motion in the direction of the axis of said drive mean to enable the opening and closing of the bottom opening to be controlled;

means for controlling the axial sliding operation of said bottom plate;

a roasted coffee beans exit chute arranged below said drum for discharging the roasted coffee beans from said drum to a vessel; and an infrared heater disposed above the upper opening of said drum to roast the coffee beans by radiation heat thereof.

7. The coffee roasting apparatus of claim 6 further including a plurality of stirring blades formed on an inner surface of said ring element.

8. The coffee roasting apparatus of claim 6 wherein said bottom plate control means comprises:

a control plate slidably attached to said drive means and held against rotation, said control plate slides axially together with said bottom plate, and a solenoid mechanism is connected with said control plate for enabling the axially sliding motion of said bottom plate.

* * * * *